United States Patent
Sasaki et al.

(10) Patent No.: US 9,435,707 B2
(45) Date of Patent: Sep. 6, 2016

(54) INTRA-CYLINDER PRESSURE SENSOR FAULT DIAGNOSTIC DEVICE AND INTRA-CYLINDER SENSOR SENSITIVITY CORRECTION DEVICE PROVIDED WITH SAME

(75) Inventors: Keisuke Sasaki, Susono (JP); Shigeyuki Urano, Gotenba (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/350,626

(22) PCT Filed: Nov. 11, 2011

(86) PCT No.: PCT/JP2011/076087
§ 371 (c)(1),
(2), (4) Date: Apr. 9, 2014

(87) PCT Pub. No.: WO2013/069157
PCT Pub. Date: May 16, 2013

(65) Prior Publication Data
US 2014/0260574 A1    Sep. 18, 2014

(51) Int. Cl.
*G01M 15/08* (2006.01)
*G01L 23/00* (2006.01)
(Continued)

(52) U.S. Cl.
CPC ............ *G01L 23/00* (2013.01); *F02D 35/023* (2013.01); *F02D 37/02* (2013.01); *F02D 41/009* (2013.01); *F02D 41/222* (2013.01);
(Continued)

(58) Field of Classification Search
CPC ........................... G01M 15/08; F02D 41/222

USPC .............................. 73/114.16, 114.17, 114.22
See application file for complete search history.

(56) References Cited

U.S. PATENT DOCUMENTS 4,531,399 A    7/1985    Aono
4,744,244 A    5/1988    Tanaka
(Continued)

FOREIGN PATENT DOCUMENTS

EP    2 375 038 A1    10/2011
JP    59 206648    11/1984
(Continued)

OTHER PUBLICATIONS

International Search Report Issued Dec. 6, 2011 in PCT/JP11/076087 Filed Nov. 11, 2011.

*Primary Examiner* — Eric S McCall
(74) *Attorney, Agent, or Firm* — Oblon, McClelland, Maier & Neustadt, L.L.P.

(57) ABSTRACT

An intra-cylinder pressure sensor fault diagnostic device that ensures an opportunity for fault diagnosis in a wide operation region, and can accurately detect an intra-cylinder pressure with a high S/N ratio. The fault diagnostic device for an intra-cylinder pressure sensor, which outputs a value corresponding to an intra-cylinder pressure of an internal combustion engine delays ignition timing so that firing timing comes after a compression top dead center to generate peaks of the intra-cylinder pressure before firing and after firing respectively. When the ignition timing is delayed, at least one of an output value of the intra-cylinder pressure sensor in the peak of the intra-cylinder pressure before firing (hereinafter, called a pre-firing output peak value) and a crank angle thereof is detected. A fault of the intra-cylinder pressure sensor is determined by using at least one of the pre-firing output peak value and the crank angle thereof.

6 Claims, 5 Drawing Sheets

(51) Int. Cl.
*F02D 41/00* (2006.01)
*F02D 41/22* (2006.01)
*F02D 35/02* (2006.01)
*F02D 41/24* (2006.01)
*F02D 37/02* (2006.01)
*F02P 5/00* (2006.01)

(52) U.S. Cl.
CPC .... *F02D 41/2474* (2013.01); *F02D 2041/227* (2013.01); *F02P 5/00* (2013.01); *Y02T 10/40* (2013.01)

(56) References Cited

U.S. PATENT DOCUMENTS

| | | | |
|---|---|---|---|
| 5,168,854 A * | 12/1992 | Hashimoto | F02D 35/023 123/406.17 |
| 5,469,735 A * | 11/1995 | Watanabe | F02D 35/023 73/1.59 |
| 2007/0221170 A1 | 9/2007 | Oki et al. | |
| 2010/0250089 A1* | 9/2010 | Buslepp | G01M 15/08 701/102 |
| 2012/0303238 A1* | 11/2012 | Verner | F02D 41/2474 701/102 |
| 2013/0060447 A1 | 3/2013 | Guerrassi et al. | |

FOREIGN PATENT DOCUMENTS

| | | |
|---|---|---|
| JP | 62 192627 | 8/1987 |
| JP | 9 195844 | 7/1997 |
| JP | 2007 211654 | 8/2007 |
| JP | 2009 24553 | 2/2009 |
| JP | 2010 127172 | 6/2010 |
| JP | 2010 174705 | 8/2010 |

* cited by examiner

INTRA-CYLINDER PRESSURE SENSOR FAULT DIAGNOSTIC DEVICE AND INTRA-CYLINDER SENSOR SENSITIVITY CORRECTION DEVICE PROVIDED WITH SAME

TECHNICAL FIELD

The present invention relates to an intra-cylinder pressure sensor fault diagnostic device that diagnoses whether or not a sensitivity fault occurs to an intra-cylinder pressure sensor that detects an intra-cylinder pressure of an internal combustion engine, and an intra-cylinder pressure sensor sensitivity correction device provided with the same.

BACKGROUND ART

There has been conventionally known an internal combustion engine provided with an intra-cylinder pressure sensor, as disclosed in Patent Literature 1, for example. Further, Patent Literature 1 discloses detecting a deviation amount of the detected pressure characteristic, which occurs due to hysteresis of the intra-cylinder pressure sensor, with respect to the reference pressure characteristic in the cylinder during fuel cut. More specifically, the deviation amount of the detected pressure characteristic with respect to the reference pressure characteristic is detected by comparing the detected pressures in the symmetrical angle positions in the detected pressure characteristic with the top dead center between the compression stroke and the expansion stroke (hereinafter, called the compression top dead center) as the center. According to the art like this, a sensitivity fault of an intra-cylinder pressure sensor can be diagnosed from the deviation amount that is detected.

CITATION LIST

Patent Literatures

Patent Literature 1: Japanese Patent Laid-Open No. 2010-127172
Patent Literature 2: Japanese Patent Laid-Open No. 2009-024553
Patent Literature 3: Japanese Patent Laid-Open No. 2010-174705

SUMMARY OF INVENTION

Technical Problem

However, the art of Patent Literature 1 is limited to the time during fuel cut, and therefore, has the problem of less opportunities for fault diagnosis during one trip. Further, since the intra-cylinder pressure during fuel cut is an extremely low pressure, there is the problem of a low S/N ratio (signal-to-noise ratio) and low detection accuracy of the intra-cylinder pressure.

The present invention is made to solve the problems described above, and has an object to provide an intra-cylinder pressure sensor fault diagnostic device that can ensure an opportunity for fault diagnosis in a wide operation region, and accurately detect an intra-cylinder pressure with a high S/N ratio. Further, the invention has an object to provide an intra-cylinder pressure sensor sensitivity correction device provided with the same.

Solution to Problem

A first invention is a fault diagnostic device for intra-cylinder pressure sensor that outputs a value corresponding to an intra-cylinder pressure of an internal combustion engine, the device comprising:
ignition timing delaying means for delaying ignition timing so that firing timing comes after a compression top dead center to generate peaks of the intra-cylinder pressure before firing and after firing respectively;
detection means for detecting at least one of an output value of the intra-cylinder pressure sensor in the peak of the intra-cylinder pressure before firing (hereinafter, called a pre-firing output peak value) and a crank angle thereof, when the ignition timing is delayed by the ignition timing delaying means; and
determination means for determining a fault of the intra-cylinder pressure sensor by using at least one of the pre-firing output peak value and the crank angle thereof.

A second invention is the intra-cylinder pressure sensor fault diagnostic device according to the first invention,
wherein the detection means detects at least the pre-firing output peak value, and
the determination means determines that a fault is present in the intra-cylinder pressure sensor, when a difference between the pre-firing output peak value and a determination value is at a predetermined value or larger.

A third invention is the intra-cylinder pressure sensor fault diagnostic device according to the second invention, further comprising:
storage means for storing a relation between a load factor and a maximum intra-cylinder pressure of a motoring waveform in advance; and
determination value setting means for acquiring the maximum intra-cylinder pressure of the motoring waveform corresponding to a present load factor from the relation, and setting the maximum intra-cylinder pressure as the determination value.

A fourth invention is an intra-cylinder pressure sensor sensitivity correction device, comprising:
the intra-cylinder pressure sensor fault diagnostic device according to the second or the third inventions; and
correction means for correcting an intra-cylinder pressure so that the difference between the pre-firing output peak value and the determination value becomes small, when it is determined that a fault is present in the intra-cylinder pressure sensor.

A fifth invention is the intra-cylinder pressure sensor fault diagnostic device according to the first invention,
wherein the detection means detects at least a crank angle at which the pre-firing output peak value is detected, and
the determination means determines that a fault is present in the intra-cylinder pressure sensor, when a difference between the crank angle at which the pre-firing output peak value is detected and the compression top dead center is at a predetermined value or larger.

A sixth invention is an intra-cylinder pressure sensor sensitivity correction device, comprising:
the intra-cylinder pressure sensor fault diagnostic device according to the fifth invention; and
correction means for correcting a phase of an intra-cylinder pressure waveform so that the difference between the crank angle at which the pre-firing output peak value is detected and the compression top dead center becomes small, when it is determined that a fault is present in the intra-cylinder pressure sensor.

Advantageous Effects of Invention

According to the first to the third inventions, fault diagnosis of the intra-cylinder pressure sensor can be performed based on the pre-firing output peak value that is detected by delaying the ignition timing, during a normal operation involving fuel injection. Since it is during a normal operation, an opportunity for fault diagnosis can be ensured in a wide operation region. Further, since the charged air amount is larger during a normal operation as compared with that during fuel cut, the pre-firing output peak value can accurately be detected with a high S/N ratio. Therefore, fault diagnosis can accurately be performed.

According to the fourth invention, when it is determined that a fault is present in the intra-cylinder pressure sensor, the intra-cylinder pressure is corrected so that the difference between the pre-firing output peak value and the determination value becomes small, whereby a proper intra-cylinder pressure can be acquired.

According to the fifth invention, the phase shift of the intra-cylinder pressure waveform can be diagnosed based on the difference between the crank angle of the pre-firing output peak value that is detected during a normal operation involving combustion and the compression top dead center. Since it is during a normal operation, an opportunity for fault diagnosis can be ensured in a wide operation region. Further, since the charged air amount is larger during a normal operation as compared with that during fuel cut, the intra-cylinder pressure can accurately be detected with a high S/N ratio, and therefore, the peak position can accurately be detected. Therefore, fault diagnosis can accurately be performed.

According to the sixth invention, when it is determined that a fault is present in the intra-cylinder pressure sensor, the phase of the intra-cylinder pressure waveform is corrected so that the difference between the crank angle at which the pre-firing output peak value is detected and the compression top dead center becomes small, whereby a proper intra-cylinder pressure can be acquired.

DESCRIPTION OF EMBODIMENTS

Hereinafter, embodiments of the present invention will be described in detail with reference to the drawings. Note that common elements in the respective drawings are assigned with the same reference signs and redundant explanation will be omitted.

Embodiment 1

System Configuration of Embodiment 1

Figure 1:
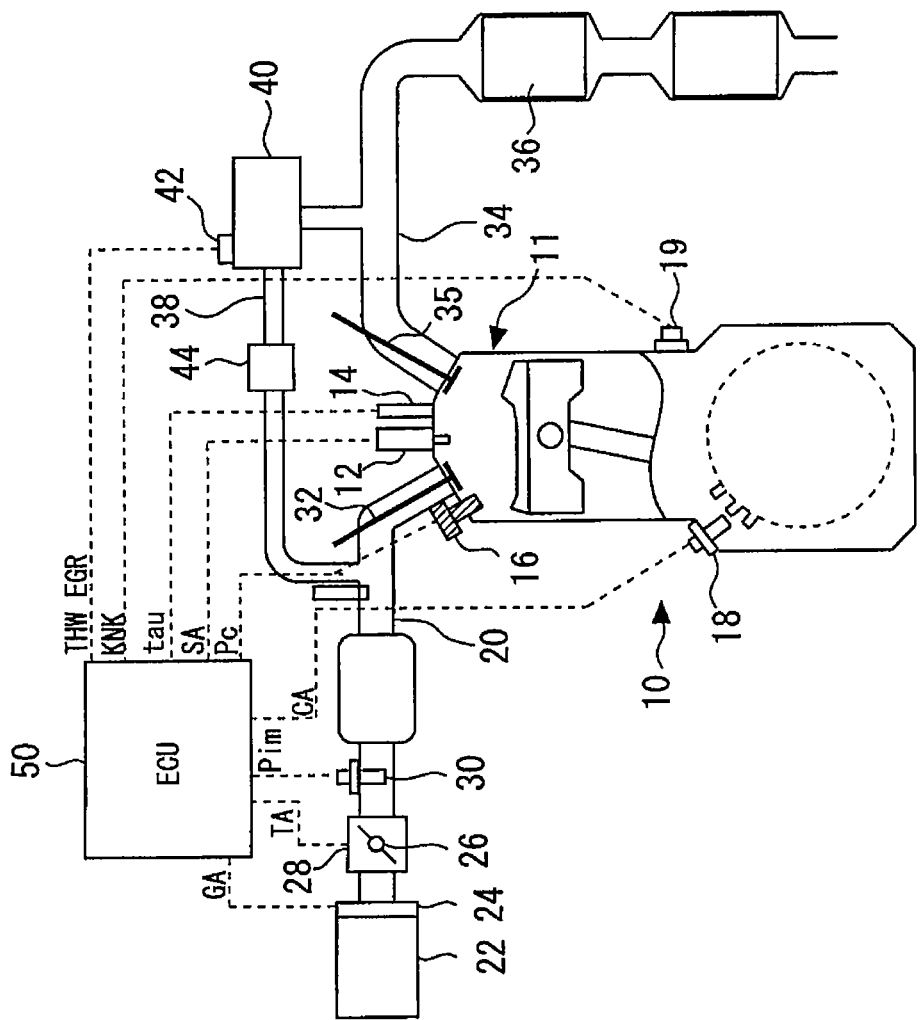
FIG. 1 is a schematic configuration diagram for explaining a system configuration of embodiment 1 of the present invention.

FIG. 1 is a schematic configuration diagram for explaining a system configuration of embodiment 1 of the present invention. The system shown in FIG. 1 includes an internal combustion engine (hereinafter, simply called an engine) 10 that is a four-stroke engine. The engine 10 includes a plurality of cylinders 11, and only one cylinder 11 among them is illustrated in FIG. 1.

To each of the cylinders 11, an ignition plug 12 that ignites an air-fuel mixture in the cylinder in response to ignition timing SA, a fuel injection valve 14 that directly injects fuel into the cylinder, and an intra-cylinder pressure sensor (CPS) 16 for detecting an intra-cylinder pressure (fuel pressure) P are mounted. Further, to the engine 10, a crank angle sensor 18 for detecting a rotation angle (hereinafter, called a crank angle CA) of a crankshaft, and a knock sensor 19 for detecting knocking are mounted.

An intake system of the engine 10 is provided with an intake passage 20 that is connected to each of the cylinders 11. An air cleaner 22 is provided upstream of the intake passage 20. An air flow meter 24 for detecting a flow rate of air that is taken into the intake passage 20 (hereinafter, called an intake air amount GA) is mounted downstream of the air cleaner 22. An electronically controlled type throttle valve 26 is provided downstream of the air flow meter 24. A throttle opening sensor 28 for detecting an opening (hereinafter, called a throttle opening TA) of the throttle valve 26 is mounted to a vicinity of the throttle valve 26. An intake pressure sensor 30 for detecting an intake pressure Pim is mounted downstream of the throttle valve 26. An intake valve 32 that opens and closes a space between the intake passage 20 and a combustion chamber of the cylinder 11 is provided at a downstream end of the intake passage 20.

An exhaust system of the engine 10 is provided with an exhaust passage 34 that is connected to each of the cylinders. An exhaust valve 35 that opens and closes a space between the exhaust passage 34 and the combustion chamber of the cylinder 11 is provided at an upstream end of the exhaust passage 34. A catalyst 36 is provided downstream of the exhaust valve 35. For the catalyst 36, for example, a three-way catalyst is used. Further, the exhaust passage 34 upstream of the catalyst 36 is provided with an EGR passage 38 that is connected to the intake passage 20. The EGR passage 38 is provided with an EGR cooler 40. A temperature sensor 42 is provided in the vicinity of the EGR cooler 40. An EGR valve 44 is provided downstream of the EGR cooler 40.

A control system of the engine 10 is provided with an ECU (Electronic Control Unit) 50. Various sensors for detecting an operating state, such as the intra-cylinder pressure sensor 16, the crank angle sensor 18, the knock sensor 19, the air flow meter 24, the throttle opening sensor 28, the intake pressure sensor 30, and the temperature sensor 42 that are described above are connected to an input section of the ECU 50. For example, the ECU 50 calculates an engine speed NE based on the crank angle CA. The ECU 50 acquires an output value of the intra-cylinder pressure sensor 16 at every predetermined angle (for example, every several degrees). The ECU 50 stores a relation between the output value of the intra-cylinder pressure sensor 16 and the intra-cylinder pressure, which is set by an experiment or the like in advance, and calculates the intra-cylinder pressure corresponding to the output value from the relation.

Further, various actuators for controlling the operating state, such as the ignition plug 12, the fuel injection valve 14, the throttle valve 26 and the EGR valve 44 that are described above are connected to an output section of the ECU 50. The ECU 50 controls the operating state of the engine 10 by operating the various actuators in accordance with a predetermined program based on the outputs of the various sensors described above. For example, the ECU 50 can optionally change the ignition timing SA. The ECU 50 can detect torque down from a reduction amount of the engine speed NE by delay of the ignition timing SA.

Characteristic Processing in Embodiment 1

Figure 2:
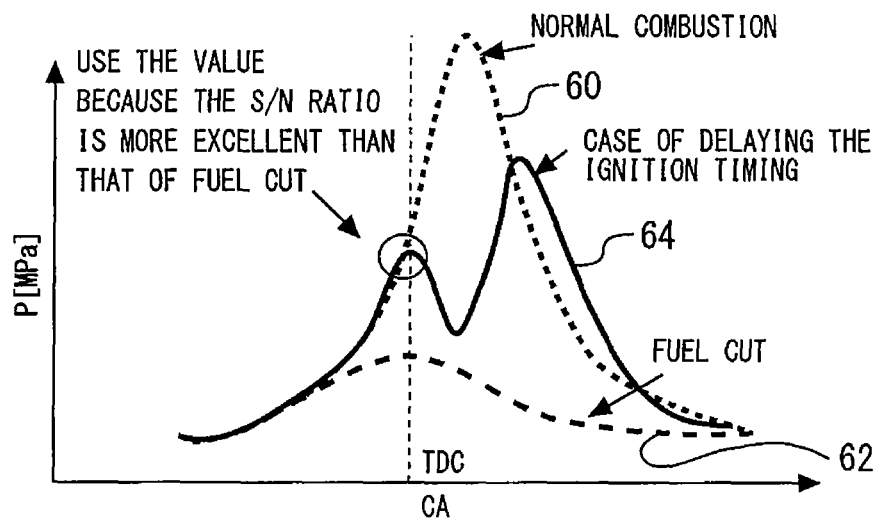
FIG. 2 is a diagram showing an intra-cylinder pressure waveform from a compression stroke to an expansion stroke according to embodiment 1 of the present invention.

Next, a method for diagnosing a sensitivity fault of the intra-cylinder pressure sensor 16 in the aforementioned system will be described. FIG. 2 is a diagram showing an intra-cylinder pressure waveform from a compression stroke to an expansion stroke. A line 60 in FIG. 2 shows an intra-cylinder pressure waveform at a time of normal combustion. A line 62 shows an intra-cylinder pressure waveform at a time of fuel cut. A line 64 shows an intra-cylinder pressure waveform in a case of delaying the ignition timing SA during a normal operation involving fuel injection.

As shown by the line 64, when the ignition timing SA is delayed so that firing timing comes after a compression top dead center, a pre-firing output peak value that is a peak of the output value of the intra-cylinder pressure sensor 16 before firing is obtained at the compression top dead center at which an intra-cylinder volume becomes minimum. Thereafter, with increase in the intra-cylinder volume, the output value decreases, but after firing, an output peak value by combustion of the air-fuel mixture is obtained. Namely, two peaks occur during one cycle. When the output value of the intra-cylinder pressure sensor 16 is normal, an intra-cylinder waveform before firing is the same shape as a motoring waveform without involving combustion. By comparing the pre-firing output peak value and the maximum intra-cylinder pressure of the motoring waveform that is stored in advance, a sensitivity fault of the intra-cylinder pressure sensor 16 can be diagnosed during a normal operation. Therefore, many opportunities for fault diagnosis in one trip can be ensured.

Figure 3:
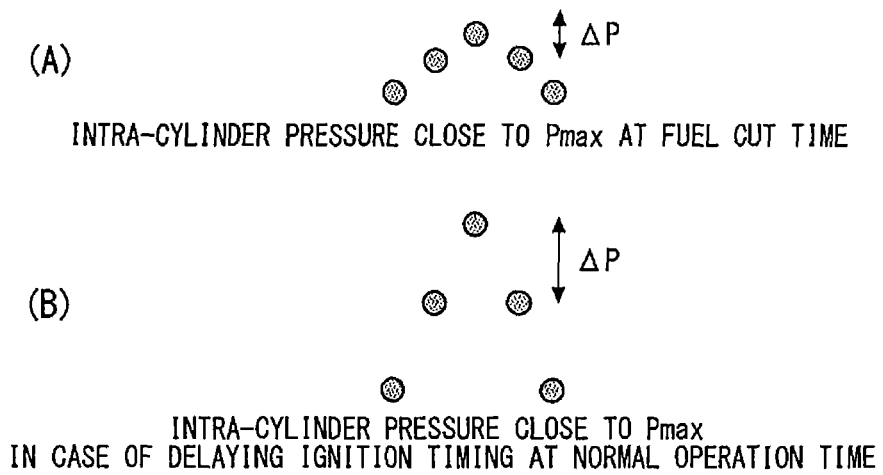
FIG. 3 is a diagram showing a change amount ΔP of the intra-cylinder pressures that are detected at predetermined crank angle intervals.

Further, since at the time of a normal operation, a charged air amount is larger as compared with that at the time of fuel cut, the intra-cylinder pressure of the motoring waveform portion becomes higher as compared with that at the time of fuel cut. FIG. 3 is a diagram showing a change amount ΔP of the intra-cylinder pressures that are detected at predetermined crank angle intervals. The change amount ΔP at the time of a normal operation shown in (B) of FIG. 3 is larger as compared with the change amount ΔP at the time of fuel cut shown in (A). Therefore, the S/N ratio is more excellent at the time of a normal operation as compared with that at the time of fuel cut. Therefore, the output value of the intra-cylinder pressure sensor 16 can accurately be detected, with a high S/N ratio.

Thus, in the system of the present embodiment, the pre-firing output peak value is acquired by delaying the ignition timing so that the firing timing comes after the compression top dead center, within a range in which torque down by delay in the ignition timing is allowed. Subsequently, the pre-firing output peak value, and the peak value of the motoring waveform in the same load condition are compared, whereby a sensitivity fault of the intra-cylinder pressure sensor 16 is diagnosed.

(Control Routine)

Figure 4:
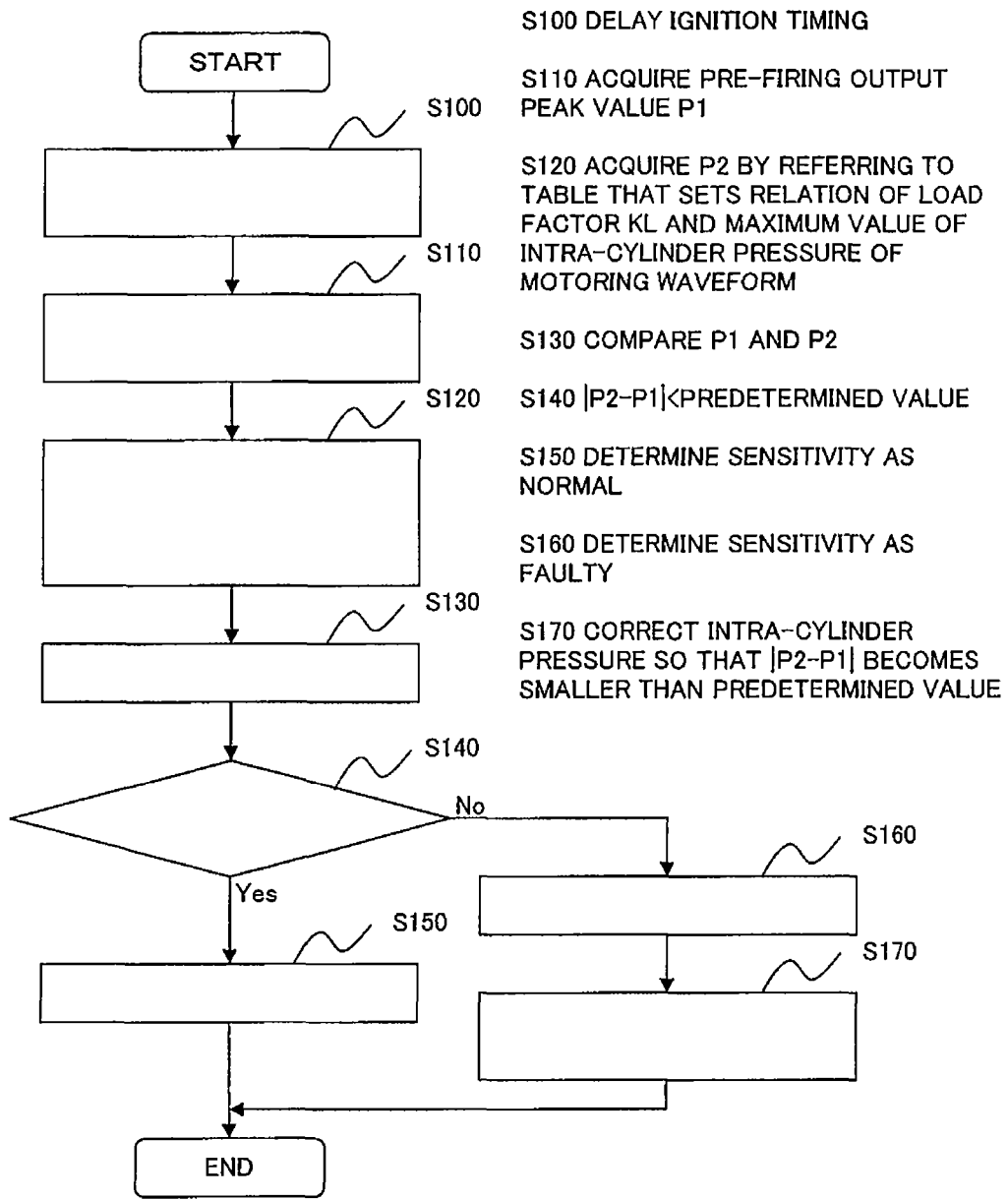
FIG. 4 is a flowchart of a control routine executed by the ECU 50 to provide the aforementioned operation according to embodiment 1 of the present invention.

FIG. 4 is a flowchart of a control routine executed by the ECU 50 to provide the aforementioned operation. The ECU 50 executes the present routine at predetermined timing during an operation involving fuel injection. The ECU 50 detects and stores the output value of the intra-cylinder pressure sensor 16 at every predetermined crank angle (for example, every several degrees).

In the routine shown in FIG. 4, the ECU 50 first delays the ignition timing SA so that the firing timing comes after the compression top dead center (step S100). Delay of the ignition timing SA is executed within the range in which torque down is allowed. For example, the ECU 50 increases a delay amount of the ignition timing SA step by step, and delays the ignition timing within the range in which the reduction amount of the engine speed NE does not exceed an allowable value. Note that the delay amount may be set and stored for each operation condition in advance.

By delaying the ignition timing SA as above, the peak of the intra-cylinder pressure also occurs before firing. The ECU 50 acquires the peak of the output value of the intra-cylinder pressure sensor 16 before firing as a pre-firing output peak value P1 (step S110).

The ECU 50 acquires a maximum value P2 of the intra-cylinder pressure of the motoring waveform corresponding to a present load factor KL at which the pre-firing output peak value P1 is acquired (step S120). More specifically, the ECU 50 stores in advance a relational table that sets the relation between the load factor KL and the maximum value P2 based on an experiment or the like. The load factor KL is calculated based on the intake air amount GA, the engine speed NE and the like. The ECU 50 acquires the maximum value P2 corresponding to the load factor KL from the relational table.

The detected pre-firing output peak value P1 and the maximum value P2 of the intra-cylinder pressure of the motoring waveform in the same operation condition are compared (step S130). The ECU 50 determines whether or not |P2−P1| is smaller than a predetermined value (step S140). When the condition of step S140 is established, namely, when |P2−P1| is smaller than the predetermined value, it is determined that the sensitivity of the intra-cylinder pressure sensor 16 is normal (step S150).

Meanwhile, when the condition of step S140 is not established, namely, when |P2−P1| is the predetermined value or more, the ECU 50 determines that a fault occurs to the sensitivity of the intra-cylinder pressure sensor 16 (step S160). In this case, the output value of the intra-cylinder pressure sensor is corrected so that |P2−P1| becomes smaller than the predetermined value (step S170). For example, with respect to the entire intra-cylinder pressure waveform, correction of multiplying the output value of the intra-cylinder pressure sensor 16 by P2/P1 as a correction coefficient is performed.

As described above, according to the routine shown in FIG. 4, the sensitivity fault of the intra-cylinder pressure sensor 16 can be diagnosed under all operation conditions, within the range in which torque down is allowed. Further, since the charged air amount is larger at the time of a normal operation as compared with that at the time of fuel cut, the S/N ratio is excellent, and the pre-firing output peak value can accurately be detected. Therefore, according to the system of the present embodiment, the opportunity for fault diagnosis can be ensured in a wide operation region, and accurate fault diagnosis can be carried out with a high S/N ratio. Furthermore, when a fault is present, the intra-cylinder pressure can be corrected properly.

The engine to which the present invention is applied is not limited to an intra-cylinder direct injection engine as in the aforementioned embodiment. The present invention also can be applied to a port-injection type engine.

Note that in embodiment 1 described above, the intra-cylinder pressure sensor 16 corresponds to the "intra-cylinder pressure sensor" in the aforesaid first invention, and the ECU 50 corresponds to the "storage means" in the aforesaid third invention, respectively.

Further, in this case, the ECU 50 executes the processing of the above described step S100, whereby the "ignition timing delaying means" in the aforesaid first invention is realized. The ECU 50 executes the processing of the above described step S110, whereby the "detection means" in the aforesaid first invention is realized. The ECU 50 executes the processing of the above described step S120, whereby the "determination value setting means" in the aforesaid third invention is realized. The ECU 50 executes the processing of the above described step S140, whereby the "determination means" in the aforesaid first invention is realized. The ECU 50 executes the processing of the above described step S170, whereby the "correction means" in the aforesaid fourth invention is realized.

Furthermore, in embodiment 1, the pre-firing output peak value P1 that is acquired in the above described step S110 corresponds to the "pre-firing output peak value" in the aforesaid first invention, and the maximum value P2 that is acquired in the above described step S120 corresponds to the "determination value" in the aforesaid second invention, respectively.

Embodiment 2

Next, embodiment 2 of the present invention will be described with reference to FIG. 5 to FIG. 6. A system of the present embodiment can be realized by causing the ECU 50 to carry out a routine of FIG. 6 that will be described later in the configuration shown in FIG. 1.

Characteristic Processing in Embodiment 2

In the aforementioned embodiment 1, in the compression top dead center before firing, the output value of the intra-cylinder pressure sensor 16 is detected. The pre-firing output peak value described in embodiment 1 is detected in the compression top dead center at a normal time, but this does not apply when a phase shift occurs. Thus, in embodiment 2 of the present invention, the ignition timing SA is delayed similarly to embodiment 1, a crank angle at which the pre-firing output peak value is detected is acquired, and based on a difference between the crank angle and the compression top dead center, the phase shift of the intra-cylinder pressure waveform is detected and corrected.

Figure 5:
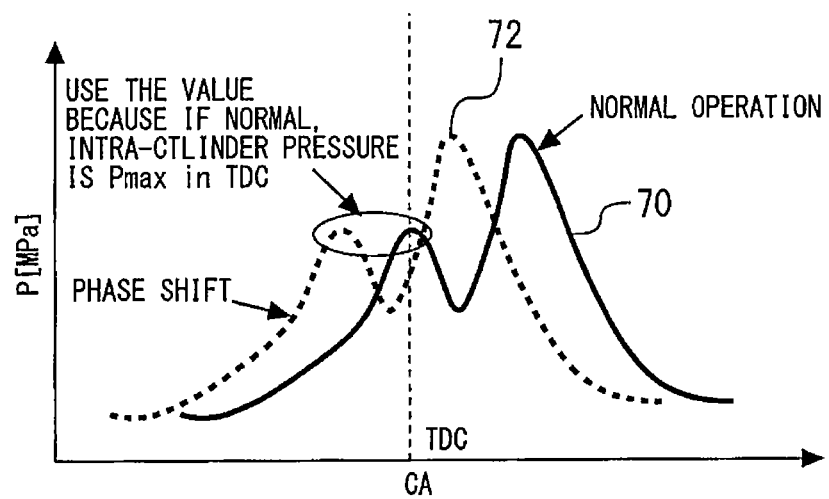
FIG. 5 is a diagram showing an intra-cylinder pressure waveform from the compression stroke to the expansion stroke according to embodiment 2 of the present invention.

FIG. 5 is a diagram showing an intra-cylinder pressure waveform from the compression stroke to the expansion stroke. A line 70 in FIG. 5 shows an intra-cylinder pressure waveform in the case of the ignition timing SA being delayed at the time of a normal operation involving combustion. The waveform is the same as that of the line 64 in FIG. 2, and therefore, explanation will be omitted. A line 72 shows an intra-cylinder pressure waveform in a case in which a phase shift occurs.

As described above, at the time of normal operation, the S/N ratio is more excellent as compared with that at the time of fuel cut (the line 62 of FIG. 2), and the pre-firing output peak value can accurately be detected. Similarly, the crank angle at which the pre-firing output peak value is detected also can accurately be detected. Therefore, the phase shift of the intra-cylinder pressure waveform can accurately be calculated from the difference between the aforementioned crank angle and the compression top dead center.

(Control Routine)

Figure 6:
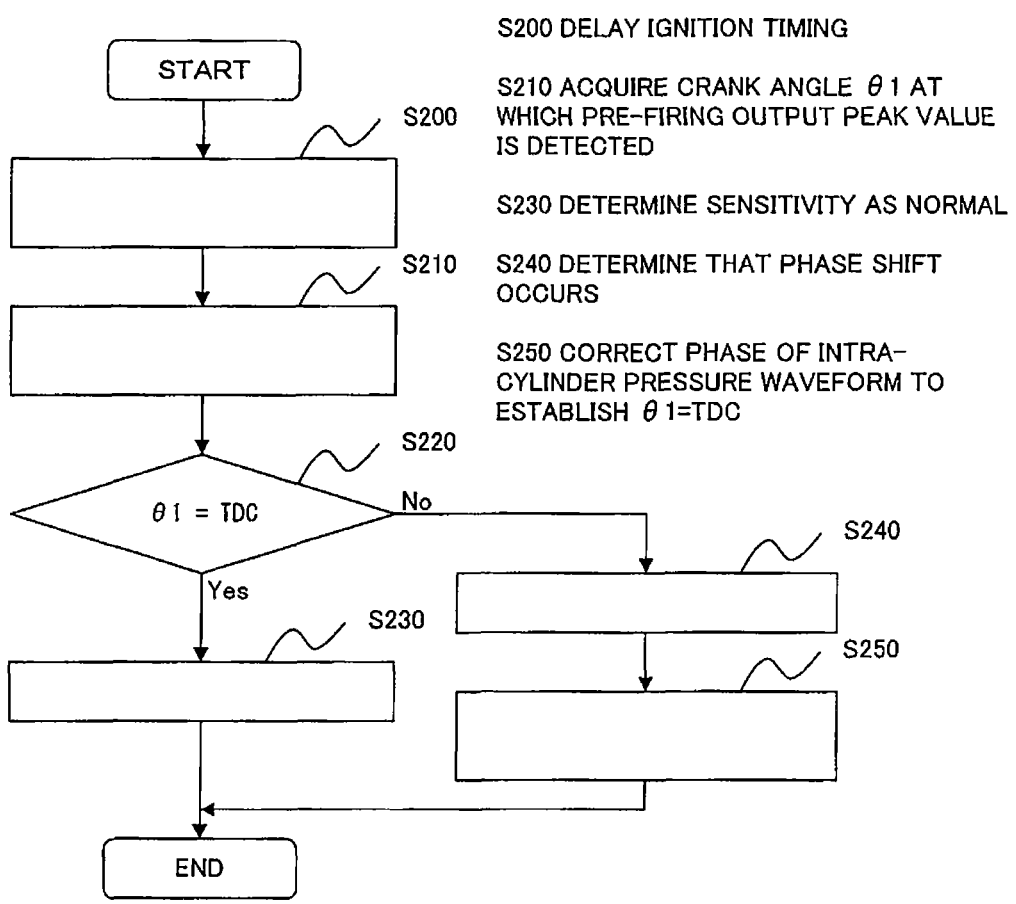
FIG. 6 is a flowchart of a control routine that is executed by the ECU 50 to provide the aforementioned operation according to embodiment 2 of the present invention.

FIG. 6 is a flowchart of a control routine that is executed by the ECU 50 to provide the aforementioned operation. The ECU 50 executes the present routine at predetermined timing during an operation involving fuel injection. The ECU 50 detects/stores the output value of the intra-cylinder pressure sensor 16 at every predetermined crank angle (for example, every several degrees).

In the routine shown in FIG. 6, the ECU 50 first delays the ignition timing SA so that the firing timing comes after the compression top dead center (step S200). Delay of the ignition timing SA is executed within the range in which torque down is allowed. This is similar to step S100 of FIG. 4, and therefore, explanation thereof will be omitted.

By delaying the ignition timing SA as above, a peak of the intra-cylinder pressure also occurs before firing. The intra-cylinder pressure waveform before firing becomes the same shape as the motoring waveform without involving combustion. The ECU 50 detects the peak of the output value of the intra-cylinder pressure sensor 16 before firing (pre-firing output peak value). Furthermore, the ECU 50 acquires a crank angle θ1 at which the pre-firing output peak value is detected (step S210).

The ECU 50 determines whether or not the crank angle θ1 corresponds to the compression top dead center (step S220). When the condition of step S220 is established, namely, when the crank angle θ1 corresponds to the compression top dead center, it is determined that the phase of the intra-cylinder pressure waveform is normal (step S230).

Meanwhile, when the condition of step S220 is not established, namely, when the crank angle θ1 shifts from the compression top dead center, the ECU 50 determines that a phase shift occurs to the intra-cylinder pressure waveform that is detected by the intra-cylinder pressure sensor 16 (step S240). In this case, the phase of the intra-cylinder pressure waveform is corrected so that the crank angle θ1 corresponds to the compression top dead center (step S250).

As described above, according to the routine shown in FIG. 6, the phase shift of the intra-cylinder pressure sensor 16 can be diagnosed in all operation conditions, within the range in which torque down is allowed. Since the charged air amount is larger at the time of a normal operation as compared with that at the time of fuel cut, the S/N ratio is excellent, and the pre-firing output peak value and the crank angle thereof can accurately be detected. Therefore, according to the system of the present embodiment, the opportunity for fault diagnosis can be ensured in a wide operation region, and accurate fault diagnosis can be carried out with a high S/N ratio. Further, when a fault is present, the phase shift of the intra-cylinder pressure waveform can be properly corrected.

Sensitivity correction and phase shift correction of the intra-cylinder pressure sensor 16 may be performed by combining the processing routine (FIG. 6) of embodiment 2 with the processing routine (FIG. 4) described in embodiment 1.

Note that in embodiment 2 described above, the ECU 50 executes the processing of the above described step S220, whereby the "determination means" in the aforesaid fifth invention is realized, and the ECU 50 executes the processing of the above described step S250, whereby the "correction means" in the aforesaid sixth invention is realized, respectively. Further, in embodiment 2, the crank angle θ1 that is acquired in the above described step S210 corresponds to the "crank angle" in the aforesaid fifth invention.

REFERENCE SIGNS LIST 10 engine
11 cylinder
12 ignition plug
14 fuel injection valve
16 intra-cylinder pressure sensor
18 crank angle sensor
19 knock sensor
20 intake passage
22 air cleaner
24 air flow meter
26 throttle valve
28 throttle opening sensor
30 intake pressure sensor
36 catalyst

The invention claimed is:

1. A fault diagnostic device for intra-cylinder pressure sensor that outputs a value corresponding to an intra-cylinder pressure of an internal combustion engine, wherein the fault diagnostic device is configured to:
   delay ignition timing so that firing timing comes after a compression top dead center to generate a peak of the intra-cylinder pressure before firing and a peak of the intra-cylinder pressure after firing;
   detect at least one of an output value of the intra-cylinder pressure sensor in the peak of the intra-cylinder pressure before firing (hereinafter, called a pre-firing output peak value) and a crank angle thereof, after the ignition timing is delayed by the fault diagnostic device; and
   diagnose presence or absence of a fault of the intra-cylinder pressure sensor by using at least one of the pre-firing output peak value and the crank angle thereof.

2. The fault diagnostic device according to claim 1,
   wherein the detecting includes detecting at least the pre-firing output peak value, and
   the diagnosing includes determining that a fault is present in the intra-cylinder pressure sensor, when a difference between the pre-firing output peak value and a determination value is at a predetermined value or larger.

3. The fault diagnostic device according to claim 2, wherein the fault diagnostic device is further configured to:
   store a relation between a load factor and a maximum intra-cylinder pressure of a motoring waveform; and
   acquire the maximum intra-cylinder pressure of the motoring waveform corresponding to a present load factor from the relation to set the maximum intra-cylinder pressure as the determination value.

4. The fault diagnostic device according to claim 2, wherein the fault diagnostic device is further configured to:
   correct an intra-cylinder pressure so that the difference between the pre-firing output peak value and the determination value becomes small, when a fault is determined to be present in the intra-cylinder pressure sensor.

5. The fault diagnostic device according to claim 1,
   wherein the detecting includes detecting at least a crank angle at which the pre-firing output peak value is detected, and
   the diagnosing includes determining that a fault is present in the intra-cylinder pressure sensor, when a difference between the crank angle at which the pre-firing output peak value is detected and the compression top dead center is at a predetermined value or larger.

6. The fault diagnostic device according to claim 5, wherein the fault diagnostic device is further configured to:
   correct a phase of an intra-cylinder pressure waveform so that the difference between the crank angle at which the pre-firing output peak value is detected and the compression top dead center becomes small, when a fault is determined to be present in the intra-cylinder pressure sensor.

* * * * *